(12) United States Patent
Lee et al.

(10) Patent No.: US 8,238,299 B2
(45) Date of Patent: Aug. 7, 2012

(54) METHOD AND APPARATUS FOR SCHEDULING IN CELLULAR SYSTEM USING CABLE RELAY STATION

(75) Inventors: Jae-Hoon Lee, Seoul (KR); Seong-Taek Hwang, Pyeongtaek-si (KR); Won-Jin Sung, Seoul (KR); Byoung-Seok Lee, Seoul (KR); Ki-Suk Sung, Seoul (KR); In-Hong Shong, Seoul (KR); Jin-Woo Choe, Seoul (KR); Yu rim Jee, legal representative, Seoul (KR)

(73) Assignees: Samsung Electronics Co., Ltd., Samsung-ro, Yeongtong-gu, Suwon-si, Gyeonggi-do (KR); Industry-University Cooperation Foundation Sogang University, Sinsu-Dong, Mapo-gu, Seoul (KR)

( * ) Notice: Subject to any disclaimer, the term of this patent is extended or adjusted under 35 U.S.C. 154(b) by 875 days.

(21) Appl. No.: 12/291,147

(22) Filed: Nov. 6, 2008

(65) Prior Publication Data

US 2009/0135778 A1    May 28, 2009

(30) Foreign Application Priority Data

Nov. 6, 2007   (KR) .......................... 10-2007-0112637

(51) Int. Cl.
*H04W 4/00* (2009.01)
(52) U.S. Cl. .......................... 370/329; 370/492; 455/450
(58) Field of Classification Search .................. 370/329, 370/311, 328; 455/454.1, 434
See application file for complete search history.

(56) References Cited

U.S. PATENT DOCUMENTS

| 7,804,805 B2 * | 9/2010 | Park et al. ..................... 370/338 |
| 2008/0123574 A1 * | 5/2008 | Sandhu et al. ................ 370/311 |

FOREIGN PATENT DOCUMENTS

KP    A 2005-131028    12/2005

\* cited by examiner

*Primary Examiner* — Donald Mills
*Assistant Examiner* — Henry Baron
(74) *Attorney, Agent, or Firm* — Cha & Reiter, LLC

(57) ABSTRACT

A method for scheduling in a cellular system using a relay station (RS) through an inter-antenna cooperative transmission technology based on pre-cooperation information according to each channel in a cellular system using a cable RS in order to increase the throughput of the entire system. The steps include classifying all mobile stations (MSs) in a corresponding cell based into Cooperative Transmission (CT) MSs for cooperative transmission and Single Transmission (ST) MSs for to each channel; mapping channel-by-channel channel capacities of the CT MSs and ST MSs classified according to each channel, selecting a channel with a highest priority, and receiving a request message from a corresponding MS according to whether the capacity of the selected channel satisfies preset CT criteria and selecting an MS having a metric value of a highest priority according to a corresponding scheduling algorithm, from among multiple requesting MSs.

10 Claims, 9 Drawing Sheets
(2 of 9 Drawing Sheet(s) Filed in Color)

METHOD AND APPARATUS FOR SCHEDULING IN CELLULAR SYSTEM USING CABLE RELAY STATION

CLAIM OF PRIORITY

This application claims priority from an application entitled "Method And Apparatus For Scheduling In Cellular System Using Cable Relay Station" filed with the Korean Intellectual Property Office on Nov. 6, 2007 and assigned Serial No. 2007-112637, the contents of which are incorporated herein by reference in its entirety.

BACKGROUND OF THE INVENTION

1. Field of the Invention

The present invention relates to radio resource allocation in a cellular system which includes a relay station (RS) using a dedicated line and a dedicated bandwidth, i.e., in a cellular system using Radio-over-Fiber (RoF). More particularly, the present invention relates to a scheduling method and apparatus for performing packet scheduling and dynamic channel allocation in order to increase the throughput of the entire system.

2. Description of the Related Art

One of several important technical factors for continuous development of wireless communication systems is the efficient management and distribution of frequency resources. To this end, research is actively being conducted on a multi-hop transmission scheme, which is developed from the conventional single-hop transmission scheme, wherein only direct transmission from one base station (BS) to a mobile station (MS) is permitted in each cell. In a system supporting the multi-hop transmission scheme, signals output from a BS are transmitted to an MS via an RS, or may be transmitted directly to the MS.

Current cellular systems may include, for example, a single-hop system, a single-hop system supporting a repeater, or a wireless multi-hop system.

The single-hop system includes a BS per cell, without a repeater, and has a construction such that a terminal or MS is directly connected to the BS without a separate relay.

The single hop system supporting repeaters includes repeaters that are additionally installed in the single-hop system in order to enhance the signal reception performance of an MS, particularly when the MS is located in a cell boundary area or a shadow area. Such a system is referred to as a repeater system.

In the repeater system, a cell includes one BS and a plurality of repeaters, and an MS transmits/receives signals at the same time to/from the BS and the repeaters. The repeater system may be classified, for example, into a cable-optical repeater structure (wired RS) and a wireless-RF repeater structure (wireless RS) according to links between the BS and the repeaters. The cable repeater has an advantage in that signal attenuation is low, but has no mobility, and the wireless repeater has a disadvantage in that all signals are amplified and broadcasted, without distinction between a signal desired by an MS and an interference signal. Also, the wireless repeater can be installed at a relatively lower cost than the cable repeater structure, but requires antenna isolation upon constructing a network.

Some of the differences between the wireless RS multi-hop system and the wireless repeater system include that while a wireless repeater amplifies and transfers not only signals received from a BS but also interference signals input from external cells, a wireless RS multi-hop system has advantages in that not only it amplifies signals desired by an MS, but also can perform scheduling and dynamic channel allocation with respect to MSs within a sub-cell formed by the wireless RS. That is, using a wireless multi-hop RS enables a BS to transmit data to even MSs located in a shadow area, to which it is difficult for the BS to directly transmit data, thereby having advantages in that the cell coverage is expanded and the cell throughput increases.

As described above, the wireless RS multi-hop system can have an enhanced transmission performance, as compared with the single-hop system or the repeater system.

Also, the wireless RS multi-hop system may be regarded as a distributed antenna system in which a BS and an RS together manage one cell. In the distributed antenna system, each BS and RS of a cellular system acts as an antenna which transmits a signal.

Moreover, one of representative inter-antenna cooperative transmission schemes in the current cellular system is a "handoff." The handoff allows, when a specific MS moves from the communication area of a first BS to the communication area of a second BS of an adjacent cell, the specific MS to move to the communication area of the second BS without disconnection of communication through switching to a channel of the second BS. The handoff may be roughly classified into a hard handoff scheme and a soft handoff scheme.

According to the hard handoff scheme, when a specific MS is moving to the area of a new cell (i.e. an adjacent cell), the specific MS cuts off the connection with an existing cell and makes a connection with a channel of the adjacent cell when the intensity of a signal received from the existing cell is equal to or less than a threshold value.

According to the soft handoff scheme, when a specific MS is moving to the area of an adjacent cell (i.e. a new cell), the specific MS simultaneously receives signals from both BSs when the intensity of a signal received from the new cell is equal to or greater than a predetermined value, and cuts off the connection with the current cell and receives signals only from the new cell when the intensity of a signal received from the current cell is equal to or less than a predetermined value.

In an environment where a specific MS is moving from the service area of a current cell to another cell, a communication failure phenomenon sometimes occurs. In this case, it is possible to prevent such a communication failure by making the specific MS belong to the service area of the new cell. Such a handoff technology functions to prevent a communication failure phenomenon from occurring due to movement, but does not guarantee an increase in the transmission capacity in view of the entire cell.

However, advanced types of inter-antenna cooperative transmission technologies, such as a signal combining technology, a space time coding technology, etc., can be effective in decreasing an outage probability due to deterioration of signal quality in a cell boundary area, as well as being able to increase a cell transmission efficiency. That is, when an MS receives service from two or more RSs, the quality of signals is improved and the data rate increases, as compared with the case where the MS receive service from only one RS. Also, when signals are transmitted from only one RS, the signal quality is degraded in a cell boundary area because the interference signals from adjacent cells are relatively stronger, so that the MS may be incapable of performing communication itself.

In contrast, when cooperative transmission by RSs in adjacent cells is performed, communication becomes possible in a cell boundary area not only because the number of interference sources decreases, but also because the intensity of received signals increases, thereby reducing the outage probability in terms of the entire cell. However, there is a problem in that a cooperative transmission between N number of antennas necessitates radio resources N times more than those necessitated for a single transmission.

Therefore, in spite of the disadvantage that N times more radio resources are used, application of an efficient scheduling and channel allocation method upon distributing radio resources in the entire system in order to improve the transmission capacity and fairness in the entire system.

In connection with this, Korean Patent Application No. 10-2005-0131028 entitled "Method And Apparatus For Scheduling In Communication System Using Multiple Channels," which refers to a user-request-based parallel scheduler showing excellent performance in the conventional multi-channel environments, discloses a technology of enhancing the system efficiency by allocating a channel to a user's MS having a relatively better channel state in consideration of a multi-user diversity gain and a multi-channel diversity gain. However, the disclosed method and apparatus are unsuitable to scheduling algorithms to which advanced types of technologies, such as the signal combining technology, the space time coding technology, etc., for inter-RS cooperative transmission, can be applied.

There is an urgent need in the art to develop a new type of scheduling and channel allocation method, which can efficiently reflect a two-dimensional diversity gain, as in the conventional multi-channel environments, and simultaneously can obtain even a multi-antenna diversity gain. In other words, a scheduling and allocation method that can efficiently support multi-antenna cooperative transmission.

SUMMARY OF THE INVENTION

Accordingly, the present invention provides a method and apparatus for radio resource allocation in a cellular system which includes a relay station (RS) using a dedicated line and a dedicated bandwidth, i.e., in a cellular system using Radio-over-Fiber (RoF), and more particularly provides a scheduling method and apparatus for performing packet scheduling and dynamic channel allocation through an inter-antenna cooperative transmission technology based on pre-cooperation information according to each channel in a cellular system using a cable RS, in order to increase the throughput of the entire system.

In accordance with an exemplary aspect of the present invention, there is provided a method for scheduling in a cellular system using a relay station (RS), the method comprising exemplary steps of: classifying all mobile stations (MSs) in a corresponding cell based on a base station (BS) into Cooperative Transmission (CT) MSs for cooperative transmission and Single Transmission (ST) MSs for single transmission according to each channel; mapping channel-by-channel channel capacities of the CT MSs and ST MSs classified according to each channel, selecting a channel with a highest priority, and receiving a request message from a corresponding MS according to whether the capacity of the selected channel satisfies preset CT criteria; selecting an MS having a metric value of a highest priority according to a corresponding scheduling algorithm, from among multiple MSs which have transmitted the request message(s), and transmitting a grant message to the selected MS; and accepting a channel of a corresponding scheduler which has transmitted the grant message.

In accordance with another exemplary aspect of the present invention, there is provided an apparatus for scheduling in a cellular system using a cable relay station, the apparatus comprising: an input unit for receiving Signal-to-Interference-plus-Noise Ratio (SINR) values from a plurality of mobile stations (MSs) according to each channel; a determination unit for calculating transmission capacities by using the SINR values of the MSs according to each channel, applying the transmission capacities to predetermined equations, and determining the MSs as Single Transmission MSs for single transmission and Cooperative Transmission MSs for cooperative transmission; a parallel packet scheduler for mapping each channel capacity according to a corresponding channel of each RS in the CT and ST modes, by means of information about the ST MSs and CT MSs classified according to each channel by the determination unit, selecting a channel having a largest channel capacity, determining if the selected channel satisfies CT criteria by checking the selected channel in a CT map, receiving either a single request message or multiple request message from MSs according to each channel based on a result of the determination, selecting an MS having the greatest scheduling metric value from among the MSs which have transmitted the request messages, and controlling a grant message to be transmitted to the selected MS; and a channel allocation unit for receiving grant message reception information from the parallel packet scheduler, and allocates a channel of a corresponding scheduler according to the grant message reception information so that the channel of the corresponding scheduler can be accepted.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

The above and other aspects, features and advantages of the present invention will be more apparent from the following detailed description taken in conjunction with the accompanying drawings, in which.

DETAILED DESCRIPTION

Figure 1:
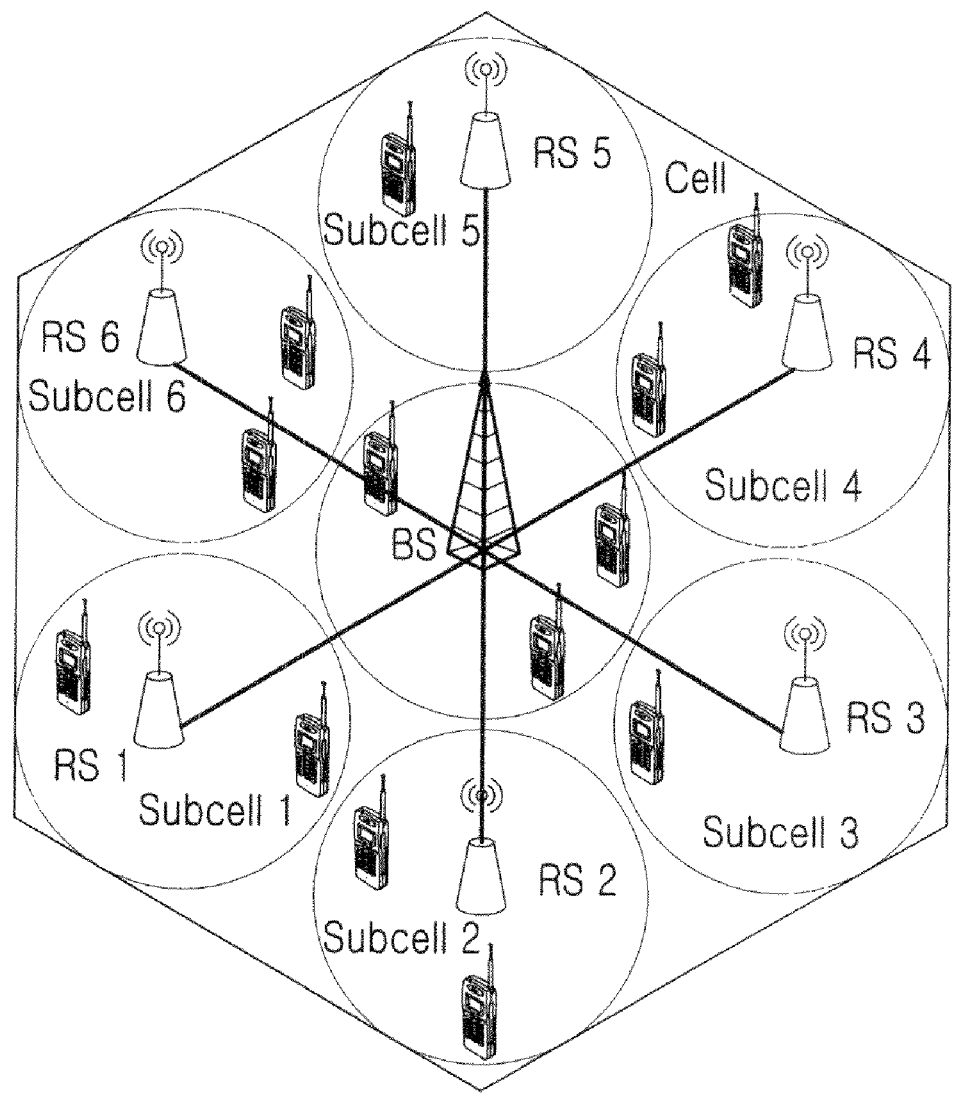
FIG. 1 is a view schematically illustrating the configuration of a cellular system using cable relay stations, to which the present invention is applied.

Hereinafter, some examples of aspects of the present invention will be described with reference to the accompanying drawings. In the below description, many particular items such as a detailed component device are shown for illustrative purposes and the invention is not limited to the examples shown in the drawings. It will be understood by those skilled in the art that various changes in form and detail may be made within the scope of the present invention.

First, the present invention will be described with relation to a centralized cellular system of an RoF system, where all algorithms for communication between a base station (BS)/relay station (RS) and a mobile station (MS) are performed by the BS, and the RS performs only a transmission function, as a basic model. Therefore, control information about all signals is collected by the BS. The BS allocates radio resources to each MS, based on the collected control information.

Also, according to the following description of the present invention, a channel in a "good" state among a plurality of available channels available every MS is allocated to the corresponding MS. In this case, since the channel state of each channel may vary over time, the channel is allocated to a corresponding MS when the channel is in a good state. Also, according to an exemplary embodiment of the present invention, since a channel in a good state may be used by a plurality of MSs, the channel in a good state is allocated to an MS having the highest priority.

In other words, according to an exemplary embodiment of the present invention, which is described herein below, a channel having the highest priority and an MS having the highest priority are determined in consideration of channels and channel states of each MS, and then a scheduling is performed. In addition, although an exemplary embodiment of the present invention will be described with relation to a cellular communication system as an example, for convenience of description, the scheduling method and apparatus proposed by the present invention will be applied not only to the cellular communication system, but also to other communication systems.

FIG. 1 is a view schematically illustrating the configuration of a cellular system using cable relay stations (RSs), to which the present invention is applied, wherein a cable RS system constituted by six RSs is illustrated. One cell may include, for example, one Base Station (BS) and six cable RSs "RS1" to "RS6," wherein each RS covers a corresponding sub-cell area. In such an RS system, an MS within the proximate range of the BS receives service from the BS, whereas an MS located around a cell boundary and thus, receives signals with a relatively lower reception SINR, receives service from a neighboring RS.

As shown in FIG. 1, such a cable RS system has an effect of splitting a cell into seven cells owing to the RSs (six RS and one BS), which is similar in division to a wireless RS system. As described above, a cable RS multi-hop system enables data to be efficiently transmitted to MSs, which are located either in a cell boundary area where a channel state is relatively poor, or in an area where many obstructions exist around an MS. Due to the cell splitting effect through the RSs, service coverage of the BS is expanded with a significant decrease in shadow areas.

The cable RS system, such as shown in FIG. 1, differs from a wireless RS system by, for example, utilizing an optical cable to link a BS to each RS, so that the cable RS system has disadvantages in additional costs is required for installing optical cables between each BS and each RS, and it is difficult or sometimes impractical to move an RSs after the RSs have been installed. However, in spite of these disadvantages, the cable RS system has merits as follows.

First, one advantage of the cable RS system is that by utilizing optical cables, the signal attenuation between a BS and an RS is nearly zero. Second, the cable RS system saves radio resources for other purposes, as compared with a wireless RS system, with the number of resources allocable to users increases as a result of the saved radio resources. Third, the saved resources makes it is possible to transmit more control signals. Therefore, the cable RS system can employ various intelligent scheduling schemes, and the implementation of which is impractical at best or not currently feasible in a wireless RS system. Fourth, the cable RS system enables various multi-hop systems to be designed, whereas the wireless RS requires more uniformity in design and implementation.

It is assumed, for example, that a transmission scheme according to the present invention, which can be applied to a cable RS system as described above, corresponds to an Orthogonal Frequency Division Multiple Access (OFDMA) scheme, and the resource allocation to MSs is performed according to each subchannel. In this case, since fading channels according to MSs are independent of each other, an MS is allocated a subchannel that is beneficial for the MS, that is, an MS is allocated to a subchannel by using multi-user diversity.

It should be noted that the present invention refers to a scheduling method capable of efficiently employing inter-antenna cooperative transmission technologies in the cellular system, by premising the cellular system, as described above, so that a central processing unit, i.e. a BS, can increase the system throughput of the entire cell based on channel information about all the MSs in the system.

Hereinafter, before a detailed description of the present invention is given, a description of the cooperative transmission technology is given first.

The cooperative transmission technology includes a signal combining method, a space-time coding (STC) method, etc.

The signal combining method includes a selection diversity combining (SDC) scheme of selecting a received signal with the best quality among signals transmitted through a plurality of antennas, an equal gain combining (EGC) scheme of matching the phases of received signals and combining the received signals, a maximum ratio combining (MRC) scheme which is designed to maximize a signal to interference-plus-noise ratio (SINR) upon signal combining, etc.

One of representative space-time coding methods is a space-time block coding scheme using two transmission antennas, which was proposed by S. Alamouti in 1998.

In this case, when MS "k" performs a single transmission (ST) through antenna "s" on subchannel "n," an SINR may be expressed as Equation 1 below.

$$\gamma_{n,k,s}^{ST} = \frac{P_s \cdot |h_s|^2}{\sum_{i \in S} P_i \cdot |h_i|^2 + N} \quad (1)$$

In Equation 1, "$P_s$" represents transmission power of antenna "s," "$h_s$" represents a channel gain between MS "k" and the antenna "s," and "N" represents an AWGN.

Figure 2A:
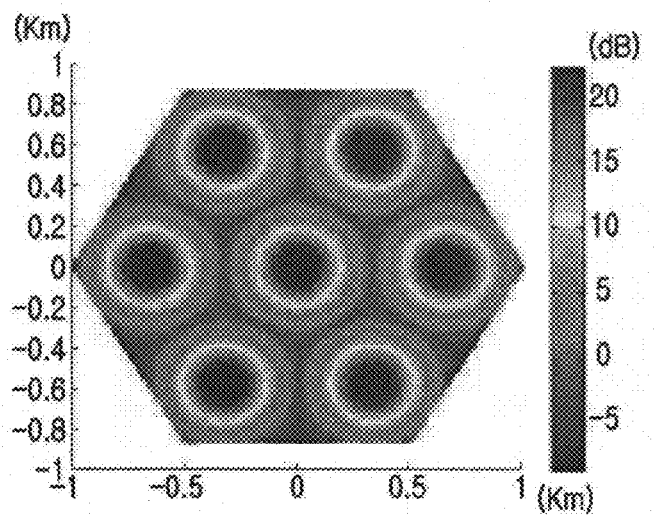
FIG. 2A is a graph illustrating SINR values when a transmission is performed in a single transmission (ST) scheme in a cellular system using cable relay stations according to an exemplary embodiment of the present invention.

Meanwhile, FIG. 2A is a graph illustrating SINR values according to an exemplary embodiment of the present invention, i.e. SINR values expressed based on Equation 1, when a transmission is performed in the single transmission (ST) scheme in an environment where only path loss is taken into consideration in a cellular system using cable relay stations.

Also, when MS "k" performs a cooperative transmission (CT) through an antenna set "S" including at least one antenna on subchannel "n," an SINR may be expressed as Equation 2 below.

$$\gamma_{n,k,s}^{CT} = \frac{\left\{\sum_{i \in S} \sqrt{P_s} \cdot |h_s|\right\}^2}{\sum_{i \in S} P_i \cdot |h_i|^2 + N} \quad (2)$$

Equation 2 is derived from an EGC scheme among the signal combining schemes, which are cooperative transmission technologies, according to an exemplary embodiment of the present invention, but the present invention is not limited to Equation 2. That is, when another cooperative transmission scheme, e.g. an MRC scheme, an STBC scheme, etc., is taken into consideration, an SINR equation changed depending on the considered scheme may be applied.

Figure 2B:
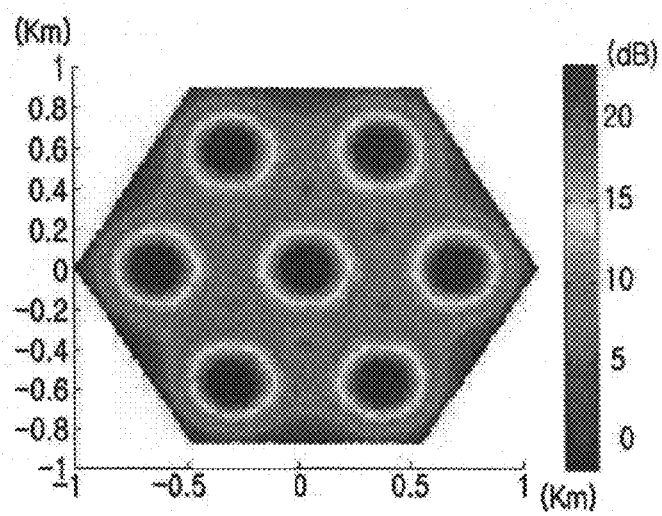
FIGS. 2B and 2C are graphs illustrating SINR values when a transmission is performed in a cooperative transmission (CT) scheme taking into consideration two antennas and three antennas, respectively, in a cellular system using cable relay stations according to an exemplary embodiment of the present invention.
Figure 2C:
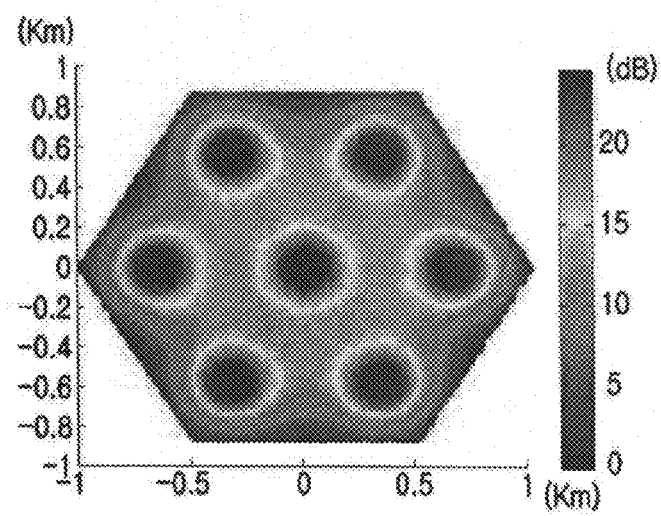

Meanwhile, FIGS. 2B and 2C are graphs illustrating SINR values, i.e. SINR values expressed based on Equation 2, when a transmission is performed in the cooperative transmission (CT) scheme using two antennas and three antennas, respectively, in an environment where only path loss is taken into consideration in a cellular system using cable relay stations according to an exemplary embodiment of the present invention. Note that FIGS. 2A to 2C illustrate simulation that the six neighboring antennas are 666 meters away from the center antenna.

According to the radio resource scheduling of the present invention, radio resources are allocated according to a status of the MS, meaning whether or not the MS there has been an advanced determination to use cooperative transmission. When MSs located within a cell are distinguished into Cooperative Transmission MSs and Single Transmission MSs in performing a radio resource scheduling, the scheduling process can be more easily performed.

To this end, in an exemplary embodiment of the present invention, which will be described later, a scheduling procedure is largely divided into two steps, and a description is as follows. That is, in the first step, MSs are distinguished between Cooperative Transmission (CT) MSs and Single Transmission (ST) MSs, thereby reducing the complexity of having to find CT MSs and ST MSs in a resource matching process for a radio resource scheduling. Thereafter, in the second step, a packet scheduling and dynamic channel allocation process is performed, which enables a channel to be preferentially allocated to an MS having a relatively better channel state, among a plurality of MSs existing in a cell, through a request-based parallel scheduler taking cooperative transmission into consideration, thereby increasing the efficiency of the entire system.

(1) Process of Distinguishing Between CT MSs and ST MSs

When N number of antennas are used for cooperative transmission, there is an increased requirement of radio resources approximately N times more than those required for a single transmission. Therefore, when a cooperative transmission makes it possible to obtain a channel capacity of at least N times more than for a single transmission, it becomes more reasonable to perform the cooperative transmission. For this reason, in an exemplary embodiment of the present invention, criteria for distinguishing between CT MSs and ST MSs according to channels are proposed.

The first criteria is the Shannon criteria, which are based on a channel capacity obtained through the Shannon capacity formula, and the second criteria is the Adaptive Modulation and Coding (AMC) criteria, which are based on the number of bits actually transmitted through a corresponding MCS-level table upon an AMC transmission.

Meanwhile, when MS "k" performs a single transmission through antenna "s" on subchannel "n," the transmission capacity thereof is expressed as "$\psi_{n,k,s}^{ST}$." In addition, when MS "k" performs a cooperative transmission through an antenna set "S" including multiple antennas on subchannel "n," the transmission capacity thereof is expressed as "$\psi_{n,k,s}^{CT}$." The respective transmission capacities of the ST and CT can be obtained by SINR values derived from Equations 1 and 2.

The respective obtained transmission capacities of the ST and CT are applied to the Shannon criteria or the AMC criteria, which will be described later, and MSs are distinguished into ST MSs and CT MSs according to a result of the application.

In detail, with respect to a certain subchannel "n," if the value obtained from a cooperative transmission determining equation, which is defined by Equation 4 or 5 below, is greater than one, a corresponding MS is determined as a CT MS, and if the obtained value is equal to or less than one, a corresponding MS is determined as an ST MS. Accordingly, by applying the Shannon criteria or the AMC criteria, which will be described below, it is determined whether each MS existing in a cell corresponds to a CT MS or an ST MS.

$$* \text{Shannon Criteria} \quad (3)$$
$$\psi_{n,k,s}^{ST} = \log_2(1 + \gamma_{n,k,s}^{ST})$$
$$\psi_{n,k,s}^{CT} = \log_2(1 + \gamma_{n,k,s}^{CT})$$

$$D_{shannon} = \frac{\psi_{n,k,s}^{CT}}{N \cdot \psi_{n,k,s}^{ST}} \quad (4)$$

(i) $D_{shannon} \leq 1$: No Combining
(ii) $D_{shannon} > 1$: Signal Combining $$* \text{AMC Criteria}$$

$$D_{AMC} = \frac{f(\gamma_{n,k,s}^{CT})}{N \cdot f(\gamma_{n,k,s}^{ST})} \quad (5)$$

(i) $D_{AMC} \leq 1$: No Combining
(ii) $D_{AMC} > 1$: Signal Combining

The criteria presented in the Shannon and the AMC is summarized as Table 1 below.

TABLE 1

| MCS Level x | C/I (dB) | Modulation | Coding rate | # of transmitted bits f(x) |
|---|---|---|---|---|
| 1 | −3.95 | QPSK | 1/12 | 1/6 |
| 2 | −1.65 | QPSK | 1/6 | 1/3 |
| 3 | 1.5 | QPSK | 1/3 | 2/3 |
| 4 | 4.3 | QPSK | 1/2 | 1 |
| 5 | 7.95 | QPSK | 2/3 | 4/3 |

TABLE 1-continued

| MCS Level x | C/I (dB) | Modulation | Coding rate | # of transmitted bits f(x) |
|---|---|---|---|---|
| 6 | 9.3 | 16 QAM | 1/2 | 2 |
| 7 | 13.1 | 16 QAM | 2/3 | 8/3 |
| 8 | 15.8 | 64 QAM | 1/2 | 3 |
| 9 | 18.45 | 64 QAM | 2/3 | 4 |
| 10 | 24.8 | 64 QAM | 5/6 | 5 |

In Table 1, "f(x)" represents the number of bits actually transmitted in the Modulation and Coding (MCS) scheme.

Figure 2D:
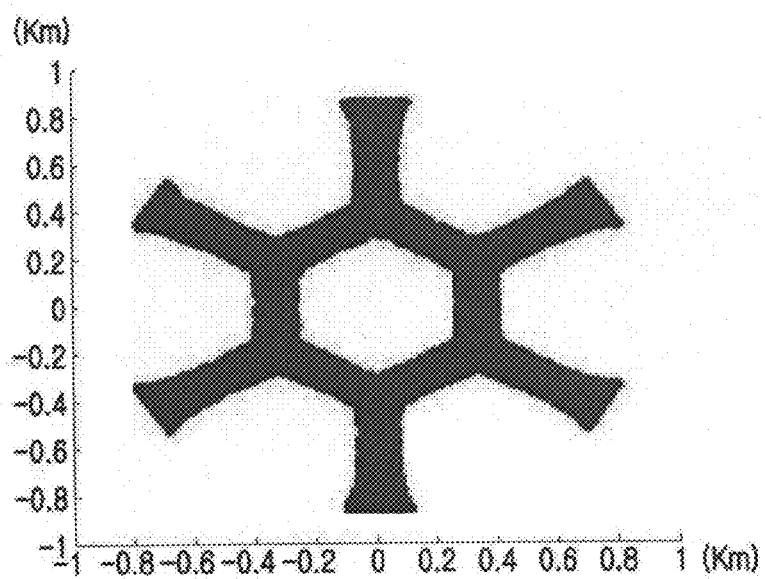
FIGS. 2D and 2E are views illustrating the distributions of MSs in areas where the CT criteria taking into consideration two antennas and three antennas, respectively, are satisfied in a cellular system using cable relay stations according to an exemplary embodiment of the present invention.
Figure 2E:
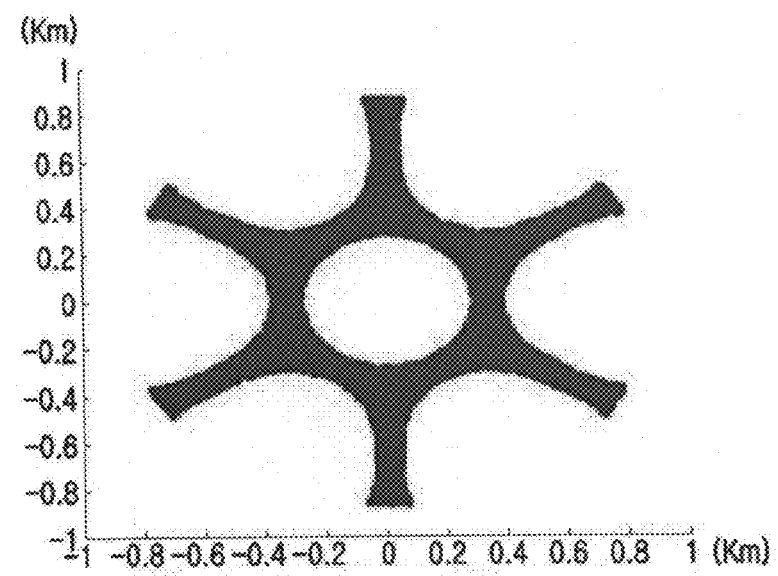

Meanwhile, FIGS. 2D and 2E are views illustrating the distributions of MSs in areas where the CT criteria taking into consideration two antennas and three antennas, respectively, are satisfied in a cellular system using cable relay stations according to an exemplary embodiment of the present invention.

Referring again to FIGS. 2D and 2E, it can be understood that MSs satisfying the criteria are located in sub-cell boundary areas.

As described above, the main target of the cooperative transmission is MSs located in the cell boundary areas. Accordingly, with the improvement of the signal quality of MSs' signals, which have poor signal quality, the outage probability of the entire system is reduced, thereby increasing the channel capacity, so that it is possible to reflect the effect of the characteristics of the cooperative transmission.

(2) Process of Packet Scheduling and Dynamic Resource Allocation

The process will now be described regarding a procedure in which CT MSs and ST MSs, which have been distinguished from each other in advance through aforementioned process (1), actually participate in a scheduling process and are allocated radio resources.

Although an MS has been established as a CT MS through process (1), the MS cannot always be provided with cooperative transmission upon an actual transmission. Only relatively better CT MSs, in competition with other CT MSs, acquire a priority in cooperative transmission. The reason the priority is acquired is because it is better in terms of the throughput of the entire system to first allocate a channel to an MS having a relatively better channel state, or an MS having a higher priority.

The scheduler proposed by the present invention corresponds to a user-request-based parallel scheduler, wherein each MS, i.e. each user, requests a channel in a relatively better state in preference to other channels so as to be allocated a good channel. The operation of the request-based parallel scheduler according to an exemplary embodiment of the present invention is performed through three phases of request, grant, and accept. A description of each phase is as follows.

Phase 1: Request Phase

MSs are classified into CT MSs and ST MSs according to each channel. Then, each user belonging to ST MSs selects one channel in the best state among all co-channels, and requests $N_{request}$ number of channels in good states among the channels, to a scheduler taking charge of each channel.

In detail, with respect to each MS according to each channel, an SINR upon performing a signal combining (i.e. upon a cooperative transmission) and an SINR upon performing no signal combining (i.e. upon a single transmission) are acquired.

Then, the channel capacities upon the cooperative transmission and upon the single transmission are mapped to ST channel capacities and CT channel capacities through the Shannon capacity formula or the MCS level table, as shown in Table 2 below.

In this case, upon the ST mapping, an antenna having the largest channel capacity is selected according to each channel, and $N_{request}$ number of channels having relatively larger channel capacities among the channels are selected.

When a channel selected in the ST mapping satisfies CT criteria of the CP mapping, that is, when it is determined that a signal combination in a process of finding CT MSs results in channel capacity at least N times larger than that obtained upon performing no signal combination, through a determination, a request message is transmitted through a corresponding antenna scheduler which performs a signal combining in a corresponding channel.

Table 2 below shows channel capacities corresponding to MS #4, wherein the number of RSs is four and $N_{request}$ is 2 on the assumption that "N=2."

TABLE 2

|  | CH 4 | CH 3 | CH 2 | CH 1 |
|---|---|---|---|---|
| RS C | 2.1 | 2.3 | 0.5 | 0.1 |
| RS B | 1.8 | 1.9 | 3.5 | 0.8 |
| RS A | 0.6 | 0.5 | 1.7 | 1.4 |

|  | CH 4 | CH 3 | CH 2 | CH 1 |
|---|---|---|---|---|
| RS B & C | 4.2 | 5.1 | 4.4 | 0.2 |
| RS A & C | 3.4 | 2.3 | 4.9 | 1.9 |
| RS A & B | 2.5 | 2.0 | 2.1 | 1.6 |

After one combination of an RS and a channel among channels #1 to #4 is selected (CH #2=>RS B, CH #3=>RSs B and C) from each mapping of ST and CT in Table 2, it is determined if the selected channel satisfies the CT criteria in the CT mapping.

For example, channel #2 has a channel capacity of "3.5" in the ST mapping and has a channel capacity of "4.9" in the CT mapping, so that the channel capacity in the CT mapping is less than twice the channel capacity in the ST mapping, thereby corresponding to an ST mode. In contrast, channel #3 has a channel capacity of "2.3" in the ST mapping and has a channel capacity of "5.1" in the CT mapping, so that the channel capacity in the CT mapping is larger than twice the channel capacity in the ST mapping, thereby corresponding to a CT mode.

Therefore, MS #4 sends a request to the scheduler of RS B with respect to channel #2 because it is in the ST mode, and transmits two requests to the schedulers of RSs B and C with respect to channel #3 because it is in the CT mode.

Figure 5A:
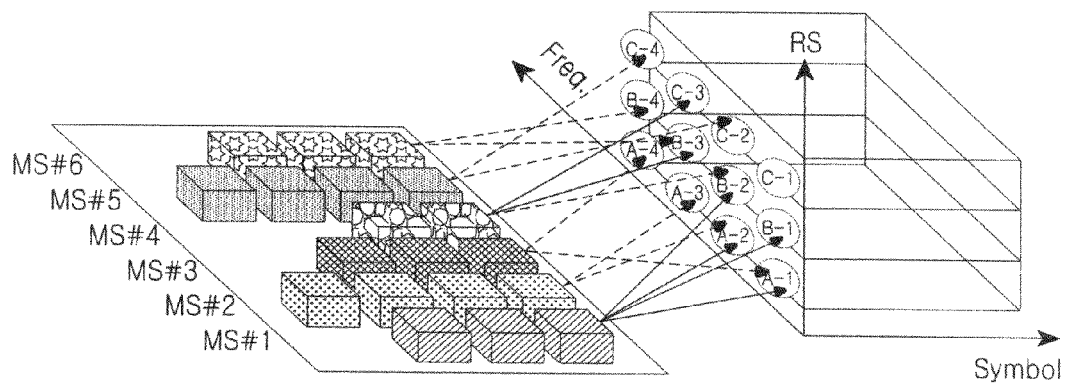
FIGS. 5A to 5C are views illustrating three phases, that is, a request phase, a grant phase, and an accept phase, respectively, according to an exemplary embodiment of the present invention.

The aforementioned request phase is schematically illustrated in FIG. 5A.

Phase 2: Grant Phase

A scheduler taking change of each channel selects an MS having a highest scheduling metric according to a scheduling algorithm of a corresponding system, from among MSs which have sent a request, and then transmits a grant message to the selected MS.

A parallel scheduling scheme operating according to each channel has an advantage in that the conventional packet scheduling algorithm can be applied to the parallel scheduling scheme without change. For example, by applying a conventional scheduler in parallel, scheduling and channel allocation are performed at the same time. Especially, according to applied packet scheduling algorithms, a large difference occurs in the performance of the entire system. Conventional representative schedulers includes a proportional fair (PF) scheduler using an opportunistic scheduling scheme, a Modified Largest Weighted Delay First (M-LWDF) scheduler, and a MAX SINR scheduler designed to maximize transmission efficiency.

The schemes determine a mobile station which an opportunity to transmit data is to be granted according to each slot every hour in a single channel system, such as a CDMA system.

In this case, each scheduler reflects a channel state between a base station and a mobile station at the moment the scheduling is performed, wherein a channel state at the current time is reflected generally by an available maximum data rate between the BS and the MS at the current time.

According to the opportunistic scheduling, an opportunity to transmit data is granted to an MS having the highest data rate at the current time in comparison with an average data rate among a plurality of MSs, so that a user-by-user diversity gain is obtained, which make it possible to expect the efficiency of the entire system to be improved.

In a wireless network, wherein channel states are different depending on MSs, and such channel states are vary over time. Therefore, a priority is granted to an MS having a good channel state than an average channel state, thereby increasing the transmission efficiency of the entire system, and achieving proportional fairness between MSs.

Hereinafter, first, a PF scheduling algorithm among the opportunistic scheduling schemes in a conventional cellular system will be described.

It is assumed that there are N number of MSs having data to transmit in a cell. The PF scheduler collects channel states from the N number of MSs, and determines an available maximum data rate "$r_k[\tau]$, k=1, ..., N" of each MS based on the collected channel states.

Next, a ratio, i.e.

$$\frac{r_k[\tau]}{\bar{r}_k[\tau]},$$

of an available maximum instantaneous data rate to an average data rate "$r_k[\tau]$, k=1, ..., N" according to each MS is calculated. In this case, an MS having the largest value of $$\frac{r_k[\tau]}{\bar{r}_k[\tau]},$$

as shown in Equation 6 below, has an opportunity to transmit data during the current time slot.

$$k^* = \max_k \arg \frac{r_k[\tau]}{\bar{r}_k[\tau]} \quad (6)$$

The average data rate is updated with respect to each MS$^i$, as shown in Equation 7 below.

$$\bar{r}_k[\tau] = \begin{cases} (1-1/t_c)\bar{r}_k[\tau-1] + (1/t_c)r_i[\tau-1], & \text{if } k^* = k \\ (1-1/t_c)\bar{r}_k[\tau-1], & \text{if } k^* \neq k \end{cases} \quad (7)$$

In this case, the value of weight constant "$t_c$" is connected with a maximum period of time during which an MS cannot receive service, and may be set to an appropriate value according to applied systems.

The next representative opportunistic scheduling scheme is the M-LWDF scheme. While the PF scheduling scheme basically does not take into consideration Quality of Service (QoS) for MSs, the M-LWDF scheduling scheme plans to guarantee QoS for MSs, which is a distinctive difference between the two schemes. The M-LWDF scheduling can be implemented by amending the priority metric (i.e. scheduling metric) for the PF scheduling, as shown in Equation 8 below.

$$k = \arg\max_k \{\beta_k[\tau] W_k[\tau] r_k[\tau]\} \quad (8)$$

$$\beta_k[\tau] = \frac{a_k}{\bar{r}_k[\tau]}$$

In Equation 8, "$a_k$" represents a parameter for taking into consideration QoS requested by mobile station "k," and "$W_k[\tau]$" represents a time delay which a head-of-line (HOL) packet included in a queue of mobile station "k" experiences until time slot "$\tau$." In the M-LWDF scheduling scheme, it is possible to guarantee QoS of packets by reflecting the "$a_k$" and "$W_k[\tau]$" in a scheduling priority metric, thereby achieving both the increase of the system efficiency and the proportional fairness, which are achieved through opportunistic scheduling in the PF scheduler. On the physical meaning of such a scheduling metric, as the value of parameter "$a_k$" for reflecting the QoS of a k$^{th}$ mobile station increases, the scheduling metric of the k$^{th}$ mobile station increases, so that the k$^{th}$ mobile station is scheduled to have a higher priority, wherein the value of parameter "$a_k$" may be set to a different value depending on the value of a parameter established as a QoS metric.

Another method for guaranteeing QoS and simultaneously increasing the efficiency of the entire system is to employ a MAX SNR scheduler, which is designed to maximize the system throughput by transmitting a grant message each channel's parallel schedulers to an MS having the highest SNIR. This MAX SNR scheduler does not take into consideration fairness between users. Such a defect can be overcome by adding an implicit scheduler, which guarantees QoS and fairness between users, at a front end of a user-request-based parallel scheduler. That is, through the implicit scheduler applied at the front end of the user-request-based parallel scheduler, the priority levels of mobile stations are determined. As a result, packets requiring preferential transmission first participate in a channel allocation process of the user-request-based parallel scheduler, which is positioned at the rear end of the implicit scheduler, thereby satisfying the QoS requirements of users.

The implicit scheduler may include, for example, a scheduler based on a GSCS parallel scheduling scheme, which uses a general service curve. The GSCS parallel scheduling scheme includes two steps. The first step corresponds to an implicit scheduling, wherein scheduling objects are divided into a urgent packet group (UPG) and an eligible packet group (EPG), and are stored. The second step corresponds to a channel allocation step, wherein a scheduling only for the UPG is performed first of all. Then, channel allocation is performed until a transmission unit is full, or until there is no data to transmit. Next, a scheduling for the EPG is performed with respect to remaining resources, and then channel allocation is performed.

Through such a two-step scheduling, resources are allocated to the UPG above all by granting the UPG a priority for scheduling, and then remaining resources in a corresponding frame are allocated for the EPG, thereby increasing the transmission efficiency. In other words, in order to perform resource allocation only to increase the system throughput, without consideration of fairness and QoS, in the request-based parallel scheduling, which is the second step, scheduling objects to be processed in the second step are restricted by taking QoS and fairness into consideration in the first step in advance, thereby satisfying the efficiency of the entire system, QoS, and fairness.

Figure 5B:
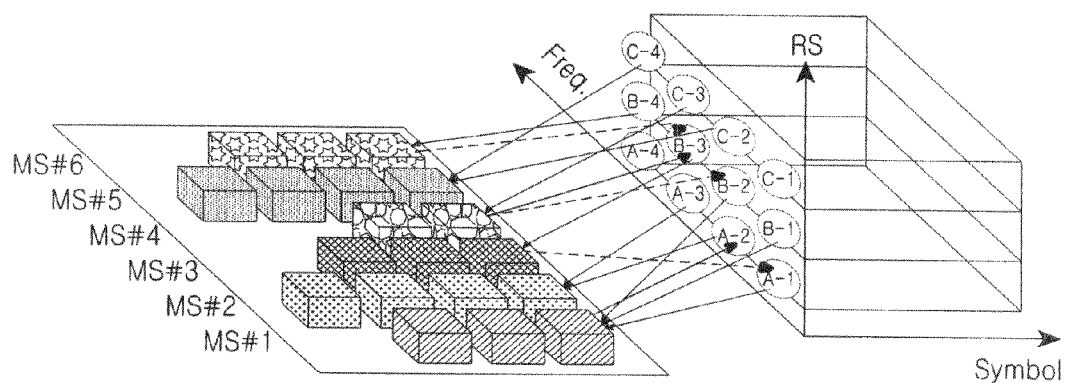

The grant phase according to the present invention is schematically illustrated in FIG. 5B.

Phase 3: Accept Phase

An MS, having sent a request in an ST mode, accepts a channel corresponding to a scheduler which has transmitted a grant message. However, an MS, having sent a request in a CT mode, must receive all the N number of grant messages in order to accept channels corresponding to schedulers which have transmitted the grant messages.

Here, in the case of an asynchronous scheduling scheme, the phases 1 to 3 are repeated between the last time slot or symbol, which has not been allocated. In the case of a synchronous scheduling scheme, the phases 1 to 3 are repeated until all channels of the current time slot or symbol are allocated, until there is no remaining channel in a corresponding system, or until MSs have no data to transmit.

Figure 5C:
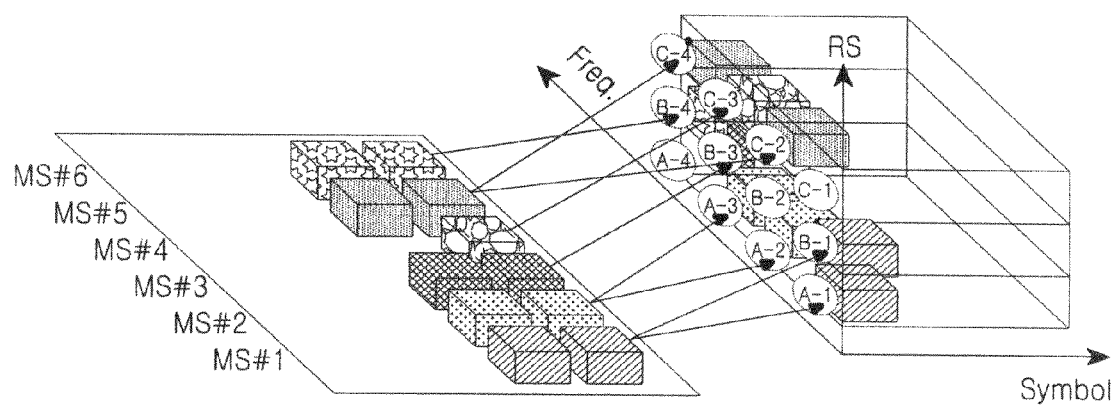

The accept phase according to the present invention is schematically illustrated, for example, in FIG. 5C.

Hereinafter, a scheduling method in a cellular system using cable relay stations according to an exemplary embodiment of the present invention will be described with reference to the aforementioned general operation according to the present invention, and FIGS. 3 and 4.

Figure 3:
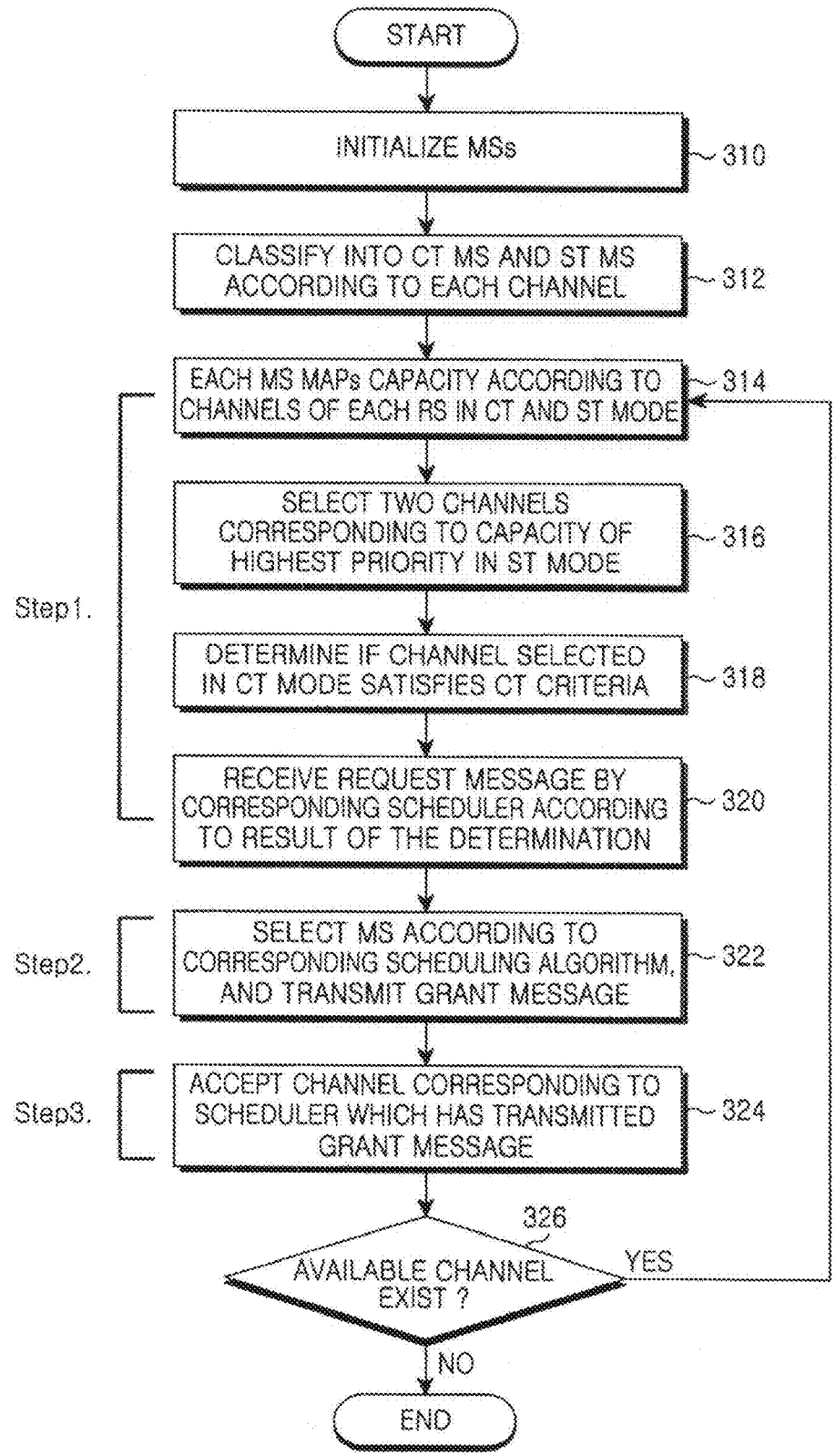
FIG. 3 is a flowchart illustrating the scheduling operation in a cellular system using cable relay stations according to an exemplary embodiment of the present invention.

FIG. 3 is a flowchart illustrating the scheduling operation in a cellular system using cable relay stations according to an exemplary embodiment of the present invention. Before scheduling is performed, MSs in a cell are initialized in step 310. The MSs are classified into CT MSs and ST MSs according to each channel in step 312. Here, the step of classifying the MSs into CT MSs and ST MSs is achieved in such a manner as to first acquire SINR values defined by Equations 1 and 2 from each MS according to each channel, and to calculate a transmission capacity "$\psi_{n,k,s}^{ST}$" upon a single transmission (ST) and a transmission capacity "$\psi_{n,k,s}^{CT}$" upon a cooperative transmission (CT) by using the acquired SINR values. The respective calculated transmission capacities for the ST and CT are applied to the Shannon criteria (i.e. Equations 3 and 4) or the AMC criteria (i.e. Equation 5), thereby classifying MSs into ST MSs and CT MSs according to a result of the application.

More particularly, with respect to a certain subchannel "n," when Equation 4 or 5 is applied, a corresponding MS is classified as a CT MS if the resulting value of the cooperative transmission determining equation is greater than one, and a corresponding MS is classified as an ST MS if the resulting value of the cooperative transmission determining equation is equal to or less than one. Accordingly, it is determined whether each MS existing in the cell corresponds to an ST MS or a CT MS by applying the Shannon criteria or the AMC criteria.

Each MS, which has been classified as an ST MS or a CT MS in step 312, maps channel capacities according to the channel of each RS in the CT and ST modes in step 314 (see Table 2). In this case, an antenna having the largest channel capacity is selected according to each channel in an ST mapping, and $N_{request}$ number of channels having relatively larger channel capacities among the channels are selected in step 316. It is determined whether the selected $N_{request}$ number of channels satisfy the CT criteria by making reference of the CT mapping in step 318.

Referring back to Table 2 above, for example, channel #2 has a channel capacity of "3.5" in the ST mapping and has a channel capacity of "4.9" in the CT mapping, so that the channel capacity in the CT mapping is less than twice the channel capacity in the ST mapping, thereby corresponding to an ST mode. In contrast, channel #3 has a channel capacity of "2.3" in the ST mapping and has a channel capacity of "5.1" in the CT mapping, so that the channel capacity in the CT mapping is larger than twice the channel capacity in the ST mapping, thereby corresponding to a CT mode.

At step 320, a corresponding scheduler of each channel receives a request message from each MS according to a result of step 318. That is, on channel #2, since the MS is in the ST mode, the MS transmits a request message to the scheduler of RS B. Also, on channel #3, since the MS is in the CT mode, the MS transmits two request messages to the corresponding schedulers of RSs B and C.

At step 322, each scheduler, which has received a request message from each MS in step 320, selects an MS having the highest scheduling metric value according to a corresponding scheduling algorithm of a system, and transmits a grant message to the selected MS.

Here, the corresponding scheduling algorithm of the system includes the PF scheduler using an opportunistic scheduling scheme, the M-LWDF scheduler, and the MAX SINR scheduler designed to maximize transmission efficiency. The PF scheduler will be explained as an example in the following description with reference to FIG. 4.

Next, each scheduler, which has transmitted the grant message in step 322, accepts a corresponding channel in step 324.

In detail, an MS having transmitted the request message in the ST mode in step 320 accepts a channel corresponding to a scheduler which has transmitted the grant message. In contrast, an MS having transmitted the request messages in the CT mode in step 320 accepts all channels corresponding to schedulers which have transmitted N number of grant messages even though it is necessary to receive all the grant messages.

At step 326, the procedure is terminated when a set of channel resources, e.g. all frames of RSs, established by a scheduling period is allocated, so that there is no channel resource to be allocated, and steps 314 to 324 are repeated when there is a channel resource to be allocated or when an MS has data to transmit.

Figure 4:
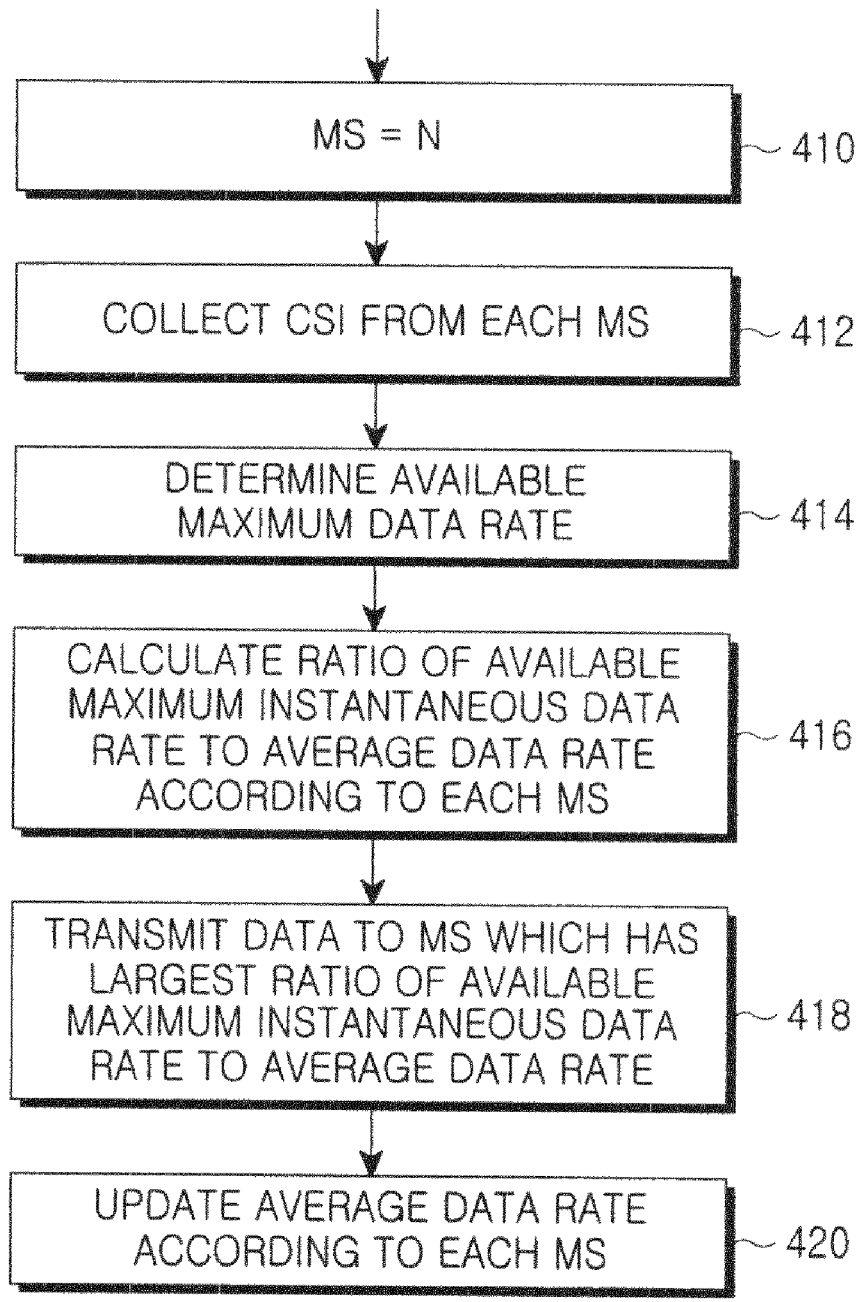
FIG. 4 is a flowchart illustrating a packet scheduling method in a cellular system using cable relay stations according to an exemplary embodiment of the present invention.

FIG. 4 is a flowchart illustrating a packet scheduling method in a cellular system using cable relay stations according to an exemplary embodiment of the present invention. First, it is assumed that N number of MSs having data to transmit exist in a cell in step 410. In step 412, channel state information (CSI) is collected from each MS. An available maximum data rate "$r_k[\tau]$, k=1, . . . , N" of each MS is determined based on the collected CSI in step 414, and a ratio of an available maximum instantaneous data rate to an average data rate according to each MS is calculated in step 416. In this case, an MS having the largest value of $$\frac{r_k[\tau]}{\bar{r}_k[\tau]},$$

as shown in Equation 9 below, has an opportunity to transmit data during the current time slot.

$$k^* = \max_k \arg \frac{r_k[\tau]}{\bar{r}_k[\tau]} \quad (9)$$

In step 418, data is transmitted to the MS having the largest value in the ratio of an available maximum instantaneous data rate to an average data rate.

Then, in step 420, the average data rate is updated with respect to each MS$^i$, as shown in Equation 10 below.

$$\bar{r}_k[\tau] = \begin{cases} (1-1/t_c)\bar{r}_k[\tau-1] + (1/t_c)r_i[\tau-1], & \text{if } k^* = k \\ (1-1/t_c)\bar{r}_k[\tau-1], & \text{if } k^* \neq k \end{cases} \quad (10)$$

In Equation 10, the value of weight constant "$t_c$" is connected with a maximum period of time during which an MS cannot receive service, and may be set to an appropriate value according to applied systems.

Meanwhile, through the entire cell efficiency of a cable RS system having a sub-cell structure, as shown in FIG. 1, and SINR distribution of MSs which are allocated resources, the performance of the scheduling and dynamic channel allocation algorithm taking cooperative transmission into consideration according to the present invention is verified.

The performance estimation is carried out through a performance analysis using the EGC scheme, which is one of representative signal combining schemes for cooperative transmission. In addition, it is assumed that a signal combining is performed by two antennas (i.e. N=2). Simulation environments are as follows.

According to the example, a bandwidth is approximately 10 MHz, the radius of the cell is approximately 1 km, and a distance from a center antenna to another antenna is approximately 0.7 km. In addition, the two antennas have the same the transmission signal power (P) of 43 dBm. A path loss model is set to "128.1+37.6*log(distance)", and a traffic model is set to a constant bit rate (CBR). A delay profile and a shadowing model are set to an "ITU-R channel model Ped. B model" and a "Log normal (8 dB)", respectively. PF schedulers are used as parallel schedulers associated with channels.

Figure 6:
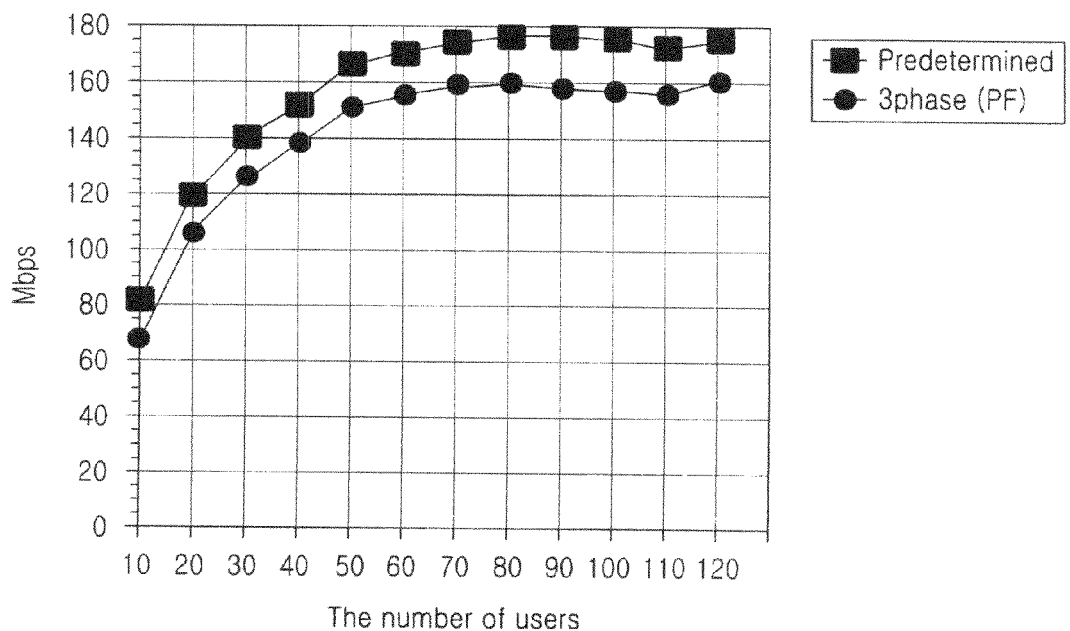
FIGS. 6 and 7 are graphs illustrating the entire cell's throughputs measured while increasing the number of MSs, and a cumulative distribution function (CDF) for SINR values of MSs which have allocated channels through an actual scheduling.
Figure 7:
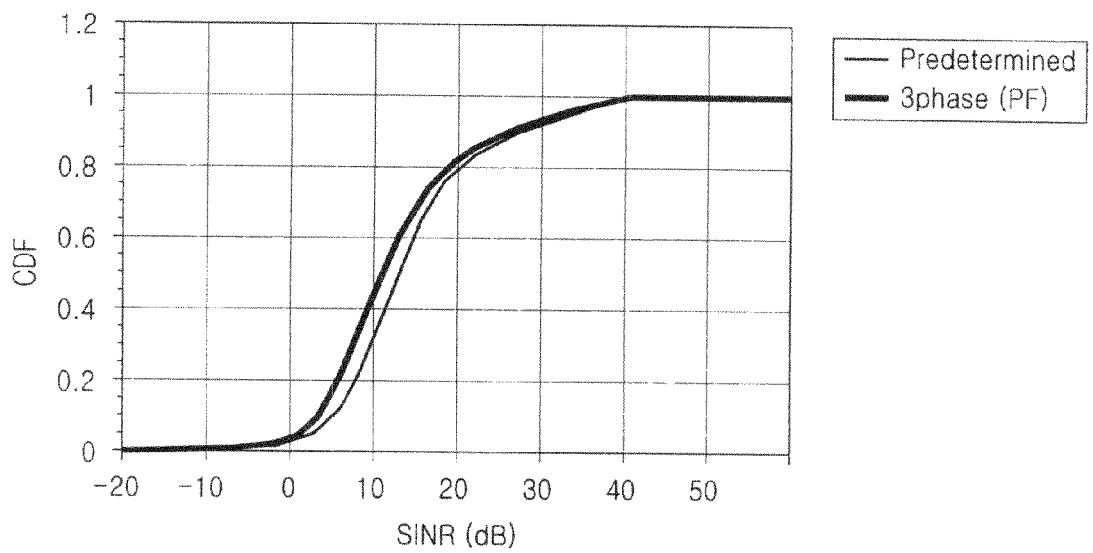

FIGS. 6 and 7 are graphs illustrating the entire cell's throughputs measured while increasing the number of MSs, and a cumulative distribution function (CDF) for SINR values of MSs which have allocated channels through an actual scheduling. From the results shown in FIGS. 6 and 7, it can be understood that the entire cell throughput is improved by 10.6%, as compared with the case of using the conventional request-based parallel scheduler (PF) taking only single transmission into consideration. In addition, the scheduling method of the present invention has an advantage in that a reception SINR increases by 1.8 dB on the basis of the center value in the cumulative distribution function.

As a result, it can be understood that, although the cooperative transmission using two antennas has a disadvantage in that resources twice as much as those required for a single transmission are used, it is possible to enhance the qualities of reception signals of mobile stations through an effective scheduling and channel allocation scheme, thereby making it possible to increase the efficiency of the entire cell.

Hereinafter, a packet scheduling apparatus in a cellular system using cable relay stations according to an exemplary embodiment of the present invention will be described with reference to the aforementioned operation of the present invention and FIG. 8.

Figure 8:
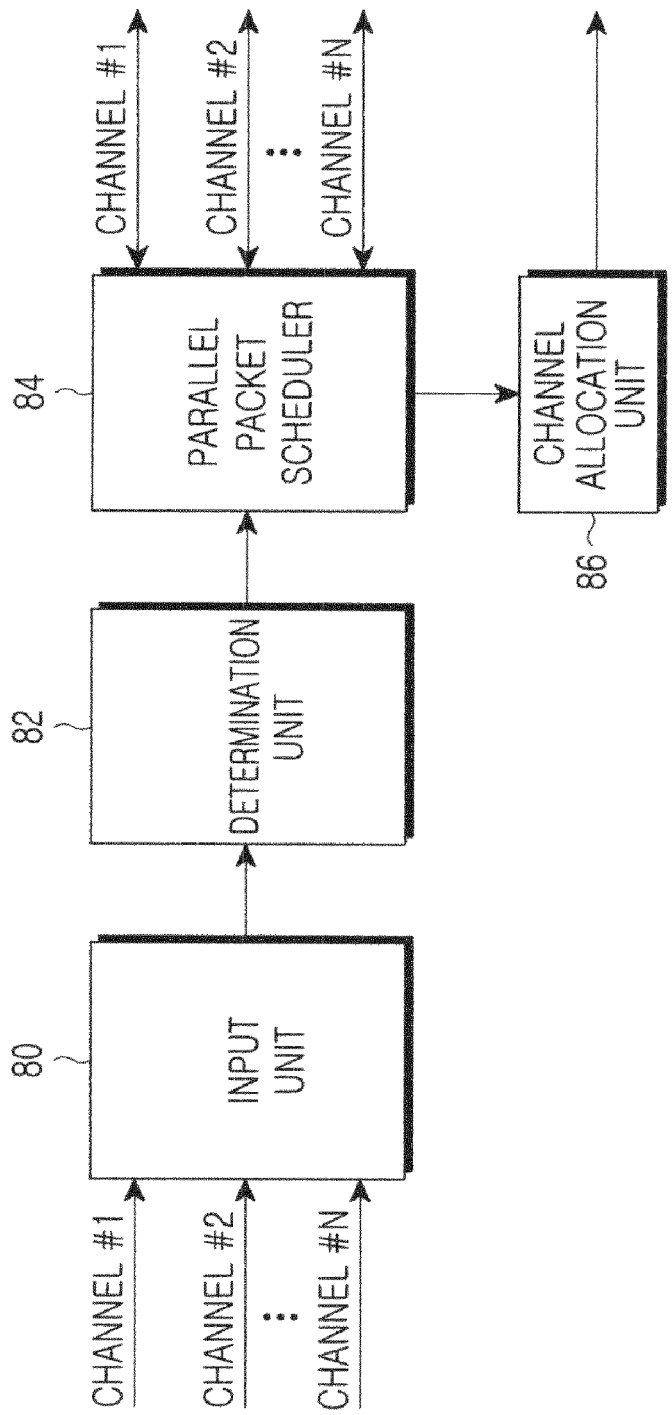
FIG. 8 is a block diagram illustrating the configuration of a packet scheduling apparatus in a cellular system using cable relay stations according to an exemplary embodiment of the present invention.

FIG. 8 is a exemplary block diagram illustrating one possible arrangement of the configuration of a packet scheduling apparatus in a cellular system using cable relay stations according to an exemplary embodiment of the present invention. The packet scheduling apparatus includes an input unit 80, a determination unit 82, a parallel packet scheduler 84, and a channel allocation unit 86.

The input unit 80 receives SINR values from MSs according to channels. In this case, the SINR values are classified as when a corresponding MS performs a signal combining on a corresponding channel, and when a corresponding MS does not perform a signal combining on a corresponding channel, that is, as a cooperative transmission and a single transmission, wherein the SINR values are expressed as $$\gamma_{n,k,s}^{CT} = \frac{\left\{\sum_{i \in S} \sqrt{P_s} \cdot |h_s|\right\}^2}{\sum_{i \in S} P_i \cdot |h_i|^2 + N}$$

for a cooperative transmission, and are expressed as $$\gamma_{n,k,s}^{ST} = \frac{P_s \cdot |h_s|^2}{\sum_{i \in S} P_i \cdot |h_i|^2 + N}$$

for a signal transmission.

The determination unit 82 calculates a transmission capacity "$\psi_{n,k,s}^{ST}$" when MS "k" performs a single transmission through antenna "s" on subchannel "n," and a transmission capacity "$\psi_{n,k,s}^{CT}$" when MS "k" performs a cooperative transmission through a set "S" of antennas on subchannel "n," by using the SINR value of a corresponding MS according to each channel, which has been input from the input unit 80.

Then, the determination unit 82 applies the respective calculated transmission capacities upon the ST and CT to the Shannon criteria or the AMC criteria, determines whether each MS corresponds to an ST MS or a CT MS according to a result of the application, and outputs a result of the determination.

The parallel packet scheduler 84 maps each channel capacity according to a corresponding channel of each RS in the CT and ST modes, by using information about ST and CT MSs classified according to each channel by the determination unit 82, selects two channels having relatively larger channel capacities from among the channels, and then determines if the two selected channels satisfy the CT criteria by checking the two channels in a CT map. According to a result of the determination, the parallel packet scheduler 84 receives a request message from each MS according to each channel.

The parallel packet scheduler 84, having received request messages from MSs according to each channel, selects an MS having the highest scheduling metric value based on the scheduling algorithm of the corresponding system from among the MSs which have transmitted the request messages, and transmits a grant message to the selected MS.

In this case, the parallel packet scheduler 84 outputs allocation information to the channel allocation unit 86 so that an MS having transmitted a request message in the ST mode can accept a channel corresponding to a scheduler which has transmitted a grant message, while an MS having transmitted a request message in the CT mode can accept all channels corresponding to schedulers which have transmitted grant messages only when N number of grant messages have all been received. Then, the channel allocation unit 86 allocates a channel according to the control of the parallel packet scheduler 84 so that a corresponding MS can accept the channel.

As described in the above examples, according to the method and apparatus according to the present invention, a method of reflecting a multi-antenna diversity gain, as well as a multi-user diversity gain and a multi-channel diversity gain based on a user-request-based parallel scheduler, is applied, while MSs within a cell share multi-channel information through wired/wireless links in a cellular system using cable relay stations. In addition, packet scheduling and dynamic channel allocation for inter-antenna cooperative transmission are performed, thereby increasing the efficiency of the entire system.

The method and apparatus for scheduling in a cellular system using cable relay stations according to an exemplary embodiment of the present invention can be implemented as described above. While the present invention has been shown and described with reference to certain exemplary embodiments thereof, it will be understood by those skilled in the art that various changes in form and details may be made therein without departing from the spirit and scope of the invention as defined by the appended claims. Accordingly, the scope of the invention is not to be limited by the above exemplary embodiments but by the claims and the equivalents thereof.

What is claimed is:

1. A method for scheduling in a cellular system using a relay station (RS), the method comprising the steps of:
   classifying each of a plurality mobile stations (MSs) in a corresponding cell based on a base station (BS) into one of a Cooperative Transmission (CT) MSs for cooperative transmission and a Single Transmission (ST) MSs for single transmission according to each channel by signal-to-interference-plus-noise ratio (SINR) values of the MSs;
   mapping the CT MSs and ST MSs classified according to each channel to a channel capacity of each channel, which has been allocated to each RS, selecting a channel with a largest channel capacity, comparing the channel capacity of the selected channel with preset CT criteria, and transmitting, by a corresponding MS, a single request message or multiple request messages to the RS through a corresponding channel according to a result of the comparison;
   selecting an MS having a metric value of a highest priority according to a corresponding scheduling algorithm from among multiple MSs which have transmitted the request message(s), and transmitting a grant message to the selected MS; and
   accepting a channel of a corresponding scheduler which has transmitted the grant message.

2. The method as claimed in claim 1, wherein the selecting channel step comprises selecting at least two channels having relatively largest channel capacities among the channels in an ST mode.

3. The method as claimed in claim 1, wherein, the step of classifying MSs into the CT MSs and the ST MSs comprises:
   calculating a transmission capacity by using a particular SINR value from the SINR values of the MSs received from each MS according to each channel; and
   applying the calculated transmission capacity of each MS to the following equations, $$\psi_{n,k,s}^{ST} = \log_2(1 + \gamma_{n,k,s}^{ST})$$

$$\psi_{n,k,s}^{CT} = \log_2(1 + \gamma_{n,k,s}^{CT}),$$

$$D_{Shannon} = \frac{\psi_{n,k,s}^{CT}}{N \cdot \psi_{n,k,s}^{ST}}$$

(i) $D_{Shannon} \leq 1$: No Combining (ii) $D_{Shannon} > 1$: Signal Combining, and $$D_{AMC} \leq \frac{f(\gamma_{n,k,s}^{CT})}{N \cdot f(\gamma_{n,k,x}^{ST})}$$

(i) $D_{AMC} \leq 1$: No Combining (ii) $D_{AMC} > 1$: Signal Combining, and classifying the MSs into ST MSs and the CT MSs according to a result, wherein "$\psi_{n,k,s}^{ST}$" represents single transmission capacity transmission "$\psi_{n,k,s}^{CT}$" represents cooperative transmission capacity, "$\gamma_{n,k,s}^{ST}$" represents signal to interference plus noise ratio (SINR) for a single transmission, "$\gamma_{n,k,s}^{CT}$" represents signal to interference plus noise ratio (SINR) for cooperative transmission, "n" represents subchannel number, "k" represents the mobile station number, "s" represents the antenna number, "ST" represents a single transmission "CT" r resents cooperative transmission "$D_{Shannon}$" represents Shannon criteria and "$D_{AMC}$" represents AMC criteria.

4. The method as claimed in claim 1, wherein the corresponding scheduling algorithm includes at least one among a proportional fair (PF) scheduler, a Modified Largest Weighted Delay First (M-LWDF) scheduler, and a MAX SINR scheduler.

5. The method as claimed in claim 1, wherein, when an MS "k" performs a single transmission (ST) through an antenna "s" on a subchannel "n," a particular SINR value is expressed by $$\gamma_{n,k,s}^{ST} = \frac{P_s \cdot |h_s|^2}{\sum_{i \in S} P_i \cdot |h_i|^2 + N},$$

in which "$P_s$" represents transmission power of antenna "s," "$h_s$" represents a channel gain between MS "k" and antenna "s," and "N" represents an AWGN, and
when MS "k" performs a cooperative transmission (CT) through an antenna set "S" including at least one antenna on subchannel "n," the SINR value is expressed by $$\gamma_{n,k,s}^{CT} = \frac{\left\{\sum_{i \in S} \sqrt{P_s} \cdot |h_s|\right\}^2}{\sum_{i \in S} P_i \cdot |h_i|^2 + N}.$$

wherein "$\gamma_{n,k,s}^{ST}$" represents signal to interference plus noise ratio (SINR) for a single transmission and "$\gamma_{n,k,s}^{CT}$" represents signal to interference plus noise ratio (SINR) for cooperative transmission.

6. The method as claimed in claim 4, further comprising, when the corresponding scheduling algorithm is the proportional fair (PF) scheduling algorithm, the steps of:
(i) collecting channel state information (CSI) from a plurality of MS having data to transmit in a cell;
(ii) determining an available maximum data rate of each MS in a form of "$r_k[\tau]$, k=1, ..., N" from the collected CSI;
(iii) calculating a ratio $$\frac{r_k[\tau]}{\bar{r}_k[\tau]}$$

of an available maximum instantaneous data rate to an average data rate according to each MS, from the determined available maximum data rate;
(iv) transmitting data to an MS having a largest value of $$\frac{r_k[\tau]}{\bar{r}_k[\tau]},$$

as shown in $$k^* = \underset{k}{\mathrm{maxarg}} \frac{r_k[\tau]}{\bar{r}_k[\tau]},$$

so that the MS can have an opportunity to transmit data during a corresponding time slot; and
(v) updating the average data rate with respect to each $MS^i$, based on $$\bar{r}_k[\tau] = \begin{cases} (1 - 1/t_c)\bar{r}_k[\tau-1] + (1/t_c)r_i[\tau-1], & \text{if } k^* = k \\ (1 - 1/t_c)\bar{r}_k[\tau-1], & \text{if } k^* \neq k, \end{cases}$$

in which weight constant "$t_c$" represents a maximum period of time during which an MS cannot receive service, where k is the mobile station number and $r_k$ is the available maximum data rate for the $k^{th}$ MS.

7. The method as claimed in claim 1, wherein, in the step of accepting the channel of the corresponding scheduler that has transmitted the grant message, each ST MS accepts a channel of a scheduler which has transmitted a grant message, and each CT MS accepts all channels of one or more schedulers which have transmitted grant messages.

8. An apparatus for scheduling in a cellular system using a cable relay station, the apparatus comprising:
an input unit for receiving signal-to-interference-plus-noise ratio (SINR) values from a plurality of mobile stations (MSs) according to each channel;
a determination unit for calculating transmission capacities of the plurality of MSs by using the SINR values of the MSs according to each channel, and applying the transmission capacities to predetermined equations:

$$\psi_{n,k,s}^{ST} = \log_2(1 + \gamma_{n,k,s}^{ST})$$

$$\psi_{n,k,s}^{CT} = \log_2(1 + \gamma_{n,k,s}^{CT}),$$

$$D_{shannon} = \frac{\psi_{n,k,s}^{CT}}{N \cdot \psi_{n,k,s}^{ST}}$$

(i) $D_{shannon} \leq 1$: No Combining
(ii) $D_{shannon} > 1$: Signal Combining
and $$D_{AMC} \leq \frac{f(\gamma_{n,k,s}^{CT})}{N \cdot f(\gamma_{n,k,x}^{ST})}$$

(i) $D_{AMC} \leq 1$: No Combining
(ii) $D_{AMC} > 1$: Signal Combining and for determining whether each of the plurality of MSs are classified as a Single Transmission MSs for single transmission or a Cooperative Transmission MSs for cooperative transmission;
a parallel packet scheduler for mapping each channel capacity according to a corresponding channel of each RS in the CT and ST modes, by information with the ST MSs and CT MSs classified according to each channel by the determination unit, for selecting a channel having a largest channel capacity, determining if the selected channel satisfies CT criteria by checking the selected channel in a CT map, for receiving either a single request message or multiple request message from MSs according to each channel based on a result of the determination, for selecting an MS having the greatest scheduling metric value from among the MSs which have transmitted the request messages, and for controlling a grant message to be transmitted to the selected MS; and
a channel allocation unit for receiving grant message reception information from the parallel packet scheduler, and for allocating a channel of a corresponding scheduler according to the grant message reception information, so that the channel of the corresponding scheduler can be accepted,
wherein "$\gamma_{n,k,s}^{ST}$" represents signal to interference plus noise ratio (SINR) for a single transmission, "$\gamma_{n,k,s}^{CT}$" represents signal to interference plus noise ratio (SINR) for cooperative transmission, "$\psi_{n,k,s}^{ST}$" represents single transmission capacity, "$\psi_{n,k,s}^{CT}$" represents cooperative transmission capacity, "n" represents subchannel number, "k" represents the mobile station number, "s" represents the antenna number, "ST" represents a single transmission, "CT" represents cooperative transmission, "$D_{Shannon}$" represents Shannon criteria and "$D_{AMC}$" represents AMC criteria.

9. The apparatus according to claim 8, wherein the determination unit selecting includes selecting at least two channels having relatively largest channel capacities among the channels in an ST mode.

10. The method as claimed in claim 8, wherein, the determination unit classifies the MSs into one of the CT MSs and the ST MSs by calculating a transmission capacity using a particular SINR value from the SINR values of the MSs received from each MS according to each channel.

* * * * *